US005448814A

United States Patent [19]
Fisher

[11] Patent Number: 5,448,814
[45] Date of Patent: Sep. 12, 1995

[54] HAND TOOL FOR REMOVAL OF ADHESIVELY MOUNTED ITEMS, PARTICULARLY CELLULAR TELEPHONE ANTENNAS

[75] Inventor: Roger K. Fisher, Mundelein, Ill.

[73] Assignee: The Antenna Company, Itasca, Ill.

[21] Appl. No.: 136,240

[22] Filed: Oct. 15, 1993

[51] Int. Cl.⁶ ........ B23P 19/04
[52] U.S. Cl. ........ 29/239; 29/267
[58] Field of Search ........ 29/239, 270, 278, 267; 81/177.1, 489

[56] References Cited

U.S. PATENT DOCUMENTS

D. 13,430 11/1882 Pope .
D. 13,431 11/1882 Pope .
D. 29,985 1/1899 Allerton .
61,504 1/1867 Bartle .
167,368 8/1875 Waitt .
284,521 9/1883 Whitacre .
496,913 5/1893 Shoe .
583,901 6/1897 House .
605,482 6/1898 Jaggard .
611,479 9/1898 Harling .
729,829 6/1903 Wysong .
896,458 8/1908 Morgan .
1,072,479 9/1913 Martindale .
1,611,408 8/1926 Bowers .
2,049,104 4/1935 Charlton .
3,175,436 3/1965 Coleman ........ 81/177.1
5,079,791 1/1992 Grech ........ 29/267

*Primary Examiner*—Robert C. Watson
*Attorney, Agent, or Firm*—Lockwood Alex FitzGibbon & Cummings

[57] ABSTRACT

A hand tool for facilitating removal of adhesively mounted objects, and in particular, cellular telephone antennas includes an engagement head and a shank portion extending away from the head and terminating in a handle. The handle is offset from the engagement head both vertically and horizontally such that when the tool is applied to an antenna module, the handle is oriented in a generally horizontal plane and the user's hand is set into a preselected orientation. Rotation of the wrist applied a twisting force to the module, resulting in a shear of the adhesive from torsion.

19 Claims, 1 Drawing Sheet

HAND TOOL FOR REMOVAL OF ADHESIVELY MOUNTED ITEMS, PARTICULARLY CELLULAR TELEPHONE ANTENNAS

The present invention generally relates to hand tools used in the removal of adhesively mounted items and, more specifically to a hand tool used in the removal of adhesively mounted cellular telephone antenna bases.

The growth of mobile and cellular telecommunications has been unprecedented in the past few years. The number of cellular telephones has increased, especially those which are mounted in vehicles and which require an antenna mounted to a window of the vehicle. A mobile, or cellular, telephone typically includes a handset mounted somewhere in the interior of the car which is connected to an exterior antenna by a coaxial cable. The antenna typically includes opposing interior and exterior modules which are mounted adhesively to a window of the vehicle. These modules are typically rectangular or square members and support various antenna components. The modules are mounted to the window surfaces by way of an adhesive. The adhesives used are conventional and proprietary adhesives. One such adhesive is disclosed in my U.S. Pat. No. 4,931,805. That adhesive, as well as others, has a strong peel strength, and therefore will resist a prying force applied to the antenna module caused by insertion of a removal tool, such as a screwdriver, between the windshield and the antenna module. This method of removal has its drawbacks in that it not only requires a large amount of prying force, but also presents that possibility that either the antenna module or window may be damaged if the tool slips.

The present invention overcomes this disadvantage by providing a hand tool which engages a substantial portion of the perimeter of the antenna foot and permits its user to apply a twisting force to the foot, thereby applying a torsional shear force to the adhesive. Because the torsional shear strength of these adhesives is low, the antenna foot is thereby easily removed from the windshield without marring or otherwise damaging the antenna foot or windshield.

The present invention accomplishes this by providing a hand tool having a head portion and a shank portion extending from the head portion and which terminates in a handle. The head portion includes an engagement opening which slips over the antenna module and engages a substantial portion of the antenna module perimeter. The shank portion is both horizontally and vertically offset such that the handle of the tool is raised above the head portion to provide better leverage to the user in view of the generally angled orientation of vehicle window surfaces. The shank portion includes a thumb engagement portion, which enables a user to orient his or her hand properly in a removal position on the tool. The horizontal offset of the shank further positions the user's hand in place on the tool handle in a proper removal orientation such that movement of the tool is effected largely by movement by the user at the wrist, rather than with the entire arm.

Accordingly, it is a general object of the present invention to provide a hand tool for facilitating the removal of adhesively mounted objects in which a head portion of the hand tool engages the object and a handle portion extends away from the head portion in a preselected orientation which permits a user to easily apply a torsional force to the object resulting in shearing of the adhesive and removal of the object from its mounting surface without marring the surface to which it is mounted.

Another object of the present invention is to provide a hand tool for the removal of cellular telephone antenna modules in which the tool has a head portion which substantially engages the perimeter of the antenna module and a shank portion which extends away from the head portion, the shank portion terminating in a handle which is generally vertically and horizontally offset with respect to a given datum, or reference line, of the tool.

A further object of the present invention is to provide a hand tool for facilitating the removal of cellular antenna modules having a handle and an engagement head interconnected by a shank, the shank including means for guiding the tool onto a antenna module, the handle being disposed in a preselected orientation with respect to the engagement head which orientation places the tool in a preferred operational position on the tool, the tool further including a registration means by which a user may register his hand in place upon the tool.

BRIEF DESCRIPTION OF THE DRAWINGS

The features of the present invention which are believed to be novel are set forth with particularity in the appended claims. The invention, together with the further objects and advantages thereof, may be best understood by reference to the following description taken in conjunction with the accompanying drawings, in the several figures of which like reference numerals identify like elements, and in which:

DETAILED DESCRIPTION OF THE PREFERRED EMBODIMENT

Figure 1:
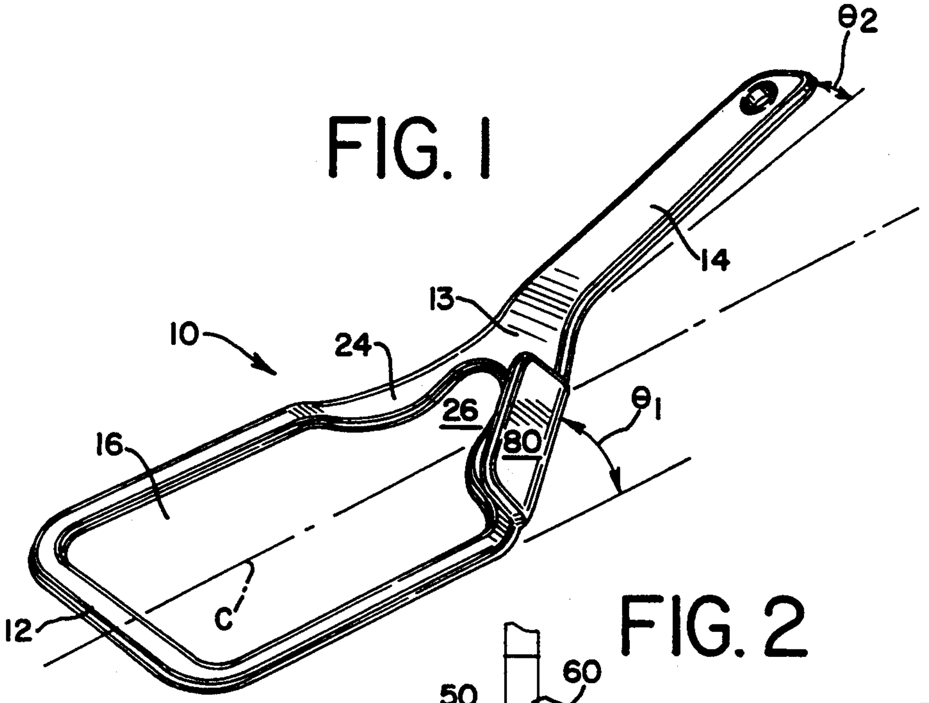
FIG. 1 is a perspective view of a hand tool constructed in accordance with the principles of the present invention.

Referring to the Figures, and particularly to FIG. 1, a hand tool 10 constructed in accordance with the present invention for use in facilitating the removal of adhesively mounted objects comprises an engagement head 12, a handle portion 14 and a shank portion 13 interconnecting the head and handle. The engagement head 12 has an object-engagement opening 16 defined therein by a plurality of arms 18 which are joined together and which define the engagement opening 16. The opening 16 is illustrated as generally rectangular in configuration which is similar to the exterior configuration of the antenna module 50 illustrated. It will be understood that the shape of the opening 16 forms no part of the present invention, except to the extent that the opening must permit the user to apply a twisting force to the antenna module 50. In this regard, the engagement opening 16 need not be closed as shown in the Figures, but may also be open.

As mentioned above, the tool 10 includes a shank, or yoke, portion 13 which extends outwardly from the engagement head 12. The shank 13 terminates in a handle portion 14 which also extends outwardly from the engagement head 12. The shank portion 13 includes a relatively wide base 24 which includes means for guiding the tool 10 into place upon an interior antenna module 52 in the form of a cutout 26 extending outwardly (and upwardly) from the engagement head opening 16. As illustrated best in FIG. 3, this cutout 26 receives and partially surrounds the coaxial antenna feed cable 72 which permits the user to apply the tool 10 directly to the interior antenna module 52 without the need for disconnecting the coaxial cable 72 at either the antenna module 52 or the telephone connection (not shown) and threading the end of the coaxial cable through the tool engagement opening 16.

The shank portion 13 of the tool extends upwardly from the engagement head 12, at an angle $\theta_1$, which raises the handle 14 of the tool 10 relative to the engagement head 12. The handle 14 may continue to rise with respect to the tool head 12 at another angle $\theta_2$ such that the handle 14 is spaced apart from the plane of the engagement head 12 to thereby allow the user to readily insert his fingers underneath the handle 14 and grasp the same without interference with the window outer surface 54*a*. Angle $\theta_2$ may also be of zero value so that the handle 14 and head 12 occupy generally parallel planes. The handle 14 may also be elevated to such an extent that when the engagement head 12 is applied to an interior antenna module 52 or an exterior antenna module 50, the handle 14 extends out in a generally horizontal plane relative to the angle of the window $\theta$. In this instance, the sum of the two angles $(\theta_1+\theta_2)$ will be equivalent to the complement of the angle of the window 54.

The tool 10 may be formed from a metal or durable plastic. In instances where the tool 10 is a metal, it may be preferable to coat the exterior surface 20 thereof with a non-abrasive compound, such as vinyl or rubber, to reduce the likelihood of scratching the window surfaces 54*a*, 54*b*.

Additionally, the handle 14 is preferably horizontally offset with respect to a datum, or reference, line C of the engagement head 12, which may or may not be the centerline of the engagement head opening 16. This horizontal offset, represented by angle $\theta_3$, positions the tool handle 14 in a proper orientation to permit the user to easily grasp it. Additionally, this offset forces the user to apply his hand to the handle 14 at a specific angle such that the removal of the antenna module 52 is effected by movement from the user's wrist rather than the entire arm.

Figure 2:
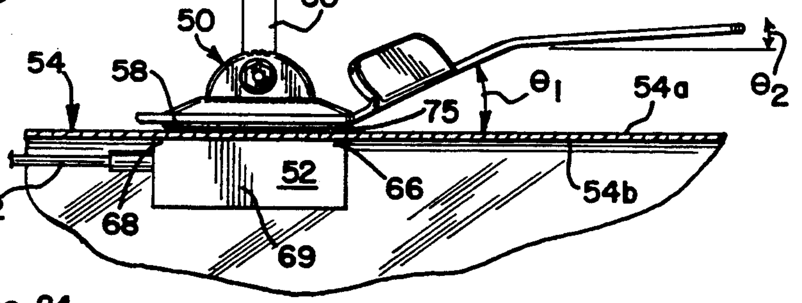
FIG. 2 is a perspective view taken from the exterior of a vehicle window of the hand tool of FIG. 1 in place upon an exterior antenna module.
Figure 3:
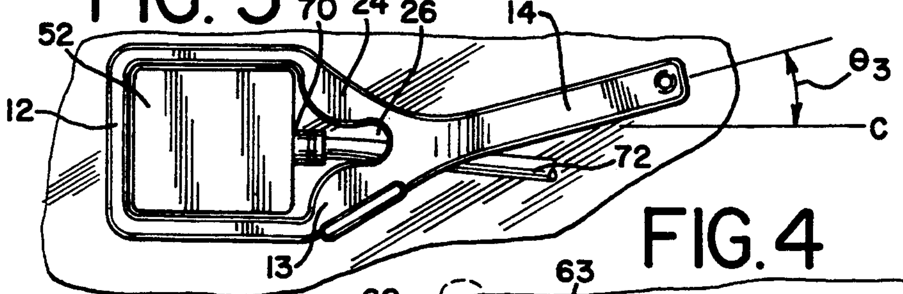
FIG. 3 is a plan view taken from the interior of the vehicle window illustrating the hand tool of FIG. 1 in place upon the interior antenna module.

FIGS. 2 and 3 respectively illustrate an exterior antenna module 50 mounted to an exterior window surface 54*a* and an interior antenna module 52 mounted to an interior window surface 54*b*. The exterior antenna module 50 is conventional in its construction in that it includes a generally rectangular base 56, formed such as by casting or otherwise, from an electrically conductive metal such as zinc, copper or aluminum to have a generally flat window engaging portion 58 and a raised radiating element receiving portion 60. The radiating element receiving portion 60 is formed between two generally opposing sidewalls 62, 63 which may be integrally formed with the base 56 of the module 50.

The interior antenna module 52 is of similar construction, having a base 66 with a generally flat window engaging portion 68 and contains an internal antenna circuit (not shown) within an outer shell cover 69. The cover 69 may include at least one opening 70 by which a coaxial feed cable 72 enters the module 52 and is connected thereto, either by way of a threaded connection or more permanent connections. In either instance, the coaxial cable 72 extends outwardly away from the interior module 52.

Both of the interior and exterior antenna modules 50, 52 are mounted in similar manners using adhesives 75 applied between the antenna module window engaging portions 58, 68 and the opposing window surfaces 54*a*, 54*b*. The adhesive may take the form of a length of double-sided adhesive tape or the like or may consist of a plurality of dabs of liquid adhesive such as epoxy or a silicone-based adhesive. A suitable adhesive mounting system is described in my previous U.S. Pat. No. 4,931,805, entitled "Adhesive System and Method for Mounting a Cellular Telephone Antenna". Antenna modules which used an adhesive tape or a liquid adhesive were previously removed by inserting a screwdriver or a like prying tool underneath an edge of the module and exerting a prying force on the module. The prying tool could result in either marring or defacing the window or the antenna module 50, 52. This problem was exacerbated because a high, relatively uncontrolled prying force was required due to the these adhesives. That is, the adhesive is strong in resisting a prying force applied to the module generally perpendicular to the plane of the mounting surface. However, these same adhesives are relatively weak in shear strength, especially in torsional shear strength. Thus, the adhesives do not effectively resist a torsional shearing force which causes the antenna module 50 to twist relative to its mounting surface 54*a*.

The hand tool 10 of the present invention is structured to apply exactly such a force. In this regard, the engagement head 12 fits over the exterior antenna module 50 (FIG. 2) or the interior antenna module 52 (FIG. 3) such that the user may easily apply a twisting force to the antenna module by a single wrist movement without exerting a great effort. To facilitate use of the tool 10 and as mentioned above, the handle 14 is vertically offset with respect to the engagement head 12 (either solely by angle $\theta_1$ or by the sum of the two angles $(\theta_1+\theta_2)$ such that the handle extends away from the window 54.

Figure 4:
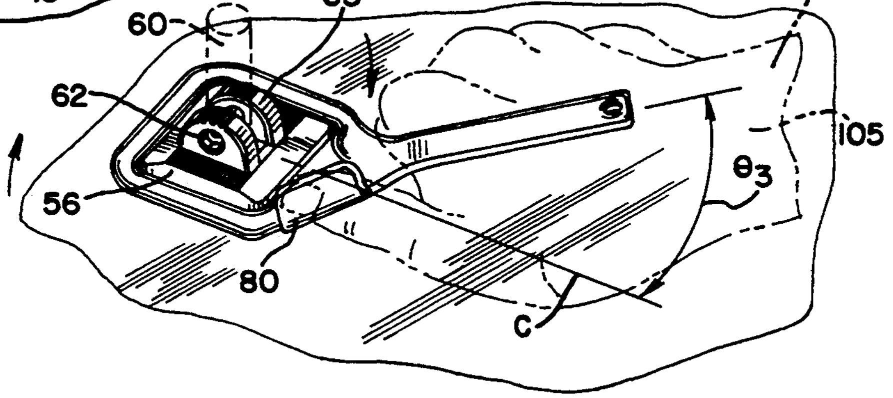
FIG. 4 is a perspective view of the hand tool of FIG. 1 with a user's hand shown in phantom in place upon the tool.

The handle 14 is also preferably provided with a means for indexing or registering the user's hand in a proper removal position. This means is illustrated in the form of a thumbplate 80 extending upwardly from the shank portion 13. As illustrated in FIG. 4, the thumbplate 80 allows the user to properly orient his hand on the tool 10, as shown, the thumbplate 80 is located on the shank 13 beneath the axis of the handle 14 so that the thumb naturally engages the thumbplate 80. Additionally, when gripped so that the user's thumb rests against the thumbplate 80, the user may apply the twisting force to the antenna modules 50, 52 by moving his hand 100 at the wrist 105, rather than at the elbow. This wrist movement applies a twisting force to the module in the direction of the arrows, thereby imparting a torsional shearing force to the adhesive interface between the module and window resulting in separation of the module from the window without the use of a prying tool and potential damage to the window or module.

While a particular embodiment of the present invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A tool for facilitating the removal of an object adhesively attached to a mounting surface such as a cellular telephone antenna module, the tool comprising:

an engagement head and a shank portion which terminates in a handle, the engagement head having an engagement opening adapted to receive the object and and further to extend around at least a portion of the object, the handle being offset from said engagement head with respect to a reference line of said engagement head such that said handle is generally spaced apart from said engagement head when applied to said object, said tool further including means for engaging the thumb of a user to thereby orient a hand of the user in position on said tool for use of said tool, said shank portion including means for guiding said engagement opening onto said object.

2. The tool of claim 1, wherein said handle portion is vertically offset relative to a plane of said engagement head and horizontally offset with respect to a centerline of said engagement opening.

3. The tool of claim 1, wherein said thumb engaging means is disposed on said shank portion.

4. The tool of claim 1, wherein said guide means includes an opening disposed in said shank portion adjacent said engagement opening, the guide means opening being adapted to receive a cable extending from said object.

5. The tool of claim 1, wherein said handle portion lies in a plane spaced apart from a plane of said engagement head.

6. The tool of claim 1, wherein said guide means includes a notch disposed in said tool and communicating with said opening.

7. The tool of claim 1, wherein said handle portion is vertically offset from said engagement head portion at a compound angle.

8. The tool of claim 1, wherein said tool is formed from metal.

9. The tool of claim 1, wherein said tool has a non-abrasive outer coating.

10. A hand tool for facilitating the removal of a cellular telephone antenna module mounted to a window of a vehicle by applying a twisting force to the module, the tool comprising:

an engagement portion having an opening which receives the antenna module, a handle extending outwardly away from the engagement portion, the handle including a shank portion interconnecting said handle with said engagement portion, said handle being angularly offset from said engagement portion in at least two different planes, said handle being firstly offset in a vertical plane with respect to said engagement portion, said handle being secondly offset in a horizontal plane with respect to a given reference line of said engagement portion, said handle further including a gripping portion for gripping by a user's hand and means for positioning the user's hand on said handle, the hand positioning means being disposed on said shank portion and including a thumb plate extending upwardly from said shank portion.

11. The hand tool of claim 10, wherein said opening is non-circular.

12. The hand tool of claim 10, wherein said shank portion includes means in the form of a notch for receiving a feed cable of said antenna module.

13. The hand tool of claim 11, wherein said shank portion is angularly offset from said engagement portion at a first angle, and said handle portion is angularly offset from said shank portion at a second angle, said first and second angles combined defining a space between said handle and said window.

14. A tool for facilitating the removal of a telephone antenna module adhesively attached to a mounting surface, the tool comprising:

an engagement head and a handle separated by a shank, the engagement head having an engagement opening defined therein by at least two engagement head arms, the engagement opening engaging a substantial portion of the antenna module when said tool is applied thereto, the handle being angularly vertically and horizontally offset from said engagement head such that said handle is generally spaced apart from said engagement head when applied to said object, said tool further including a thumbplate extending outwardly from said shank for engaging the thumb of a user to thereby orient a hand of the user in position on said tool for use of said tool, said shank further including an opening communication with said engagement opening for receiving a feed cable of the antenna module therein.

15. The tool of claim 9, wherein said outer coating is a vinyl coating.

16. The tool of claim 1, wherein said engagement head completely surrounds said engagement opening.

17. The hand tool of claim 10, wherein said engagement portion completely surrounds said opening.

18. The telephone antenna module removal tool of claim 14, wherein said handle is vertically offset from said engagement head at a compound angle.

19. The telephone antenna module removal tool of claim 14, wherein said tool has an exterior outer coating formed from a non-abrasive material.

* * * * *